Patented June 5, 1923.

1,457,321

UNITED STATES PATENT OFFICE.

BENJAMIN H. STRONG, OF WEST POINT, MISSISSIPPI.

CRAWFISH DESTROYER.

Application filed June 29, 1922. Serial No. 571,800.

*To all whom it may concern:*

Be it known that I, BENJAMIN H. STRONG, a citizen of the United States, residing at West Point, in the county of Clay and State of Mississippi, have invented certain new and useful Improvements in Crawfish Destroyers, of which the following is a specification.

The present invention relates to destroying crawfish, and involves the step of generating or liberating hydrocyanic acid vapor in the holes in which the crawfish live largely during the daytime. The crawfish as is well understood, is a small crustacean having a shape somewhat resembling that of a lobster and he bores a hole downwardly into the earth, going down until he strikes the water level. Ordinarily there is some water in the bottom of the hole. The animal lives in the hole during practically all of the daytime but comes out at night and is very destructive to certain crops, cutting off the plants at about the ground line and thereby causing immense damage in many localities. The particular variety of crawfish which cause the most damage are those which live away from brooks, swamps and the like and which bore holes down into the ground for considerable depth, in many cases as much as ten to twenty feet and sometimes more. These animals cannot readily be controlled by the use of poisons which are to be eaten. They seem to be immune to most kinds of poisons, even the violent poisons, such as cyanide, arsenicals, phosphorus, and even mercurial compounds. Heretofore attempts have been made to destroy these crustaceans by the use of carbon bisulfide, for example, by pouring a small amount of carbon bisulfide into each hole, this in some cases works very well, particularly where the holes are straight, but in many cases the holes are not straight and the animal in boring downwardly goes out around stones or other obstructions which he meets.

In acordance with the present invention a ball or a lump of material which can roll is inserted into the hole in which the animal lives, these articles being capable of liberating hydrocyanic acid gas or vapor within the hole. A very small amount of hydrocyanic acid vapor or gas in the atmosphere in the hole will quickly kill the animal. In the preferred form of the invention, I employ an inert filler, such as kaolin, clay, garden soil, ground mineral or the like, with this material is used a hardener which may be plaster of Paris or other hydraulic cement. The hardener is used in proportion corresponding to 10% or so of the entire mixture. Together with the above materials is employed a binder for which purpose molasses or syrup or similar material may be used. This ingredient may constitute about 10% of the entire mass. A small amount of a cyanide, for example, sodium cyanide, potassium cyanide or other soluble cyanide is also used. The amount of this material need not be large and in fact one or two grains has been found to be about the preferred proportion in each one of the balls or pellets to be described below.

In making up these balls or pellets, a large amount of fine dried earth or any of the fillers above referred to or other suitable inert material, preferably a material which will not be eaten by the crawfish is used. This is mixed with plaster of Paris or other hardener and with molasses or other binder, in the relative proportions above referred to. A small proportion of a cyanide is then added and the mass is molded or otherwise shaped into suitable shapes, for which purpose I have found small marbles of about one-third of an inch diameter to be very suitable. A small amount of plaster of Paris will, when acted upon by the moisture of the molasses, be readily hardened. These pills or balls may then be dried somewhat, if desired, and are preferably coated with a composition which is not readily pervious to gases or vapors. A cheap varnish can be used, if desired, for coating the balls. Glue, dextrine, starch paste and the like are also mentioned as suitable coating materials. After the coating is applied, it is dried and the balls will then keep for a long time without the loss of any of their cyanide content. These balls are at the time of use, dropped into the holes inhabited by the crawfish. A single ball dropped into each hole will be found entirely sufficient, even although many of the holes may contain several crawfish. The moisture or water in the bottom of the hole inhabited by the crawfish will normally be rather strongly impregnated with carbon dioxid absorbed from the atmosphere of the soil. This will readily react with the cyanide as the pill disentegrates causing the evolution of hydrocyanic acid gas or vapor, which will in part impregnate the water and will in part impregnate the atmosphere within the hole. The result in either case is the same, namely the death of the crawfish.

I have above referred to the use particularly of non-edible material for making the balls or pills. Many attempts have been made to destroy crawfish by causing them to eat poisons. In accordance with the present invention, it is not desired that the crawfish eat the pills, since the same would not have the desired effect if eaten by the crawfish and my experiments have indicated that it is practically imposible to kill crawfish by having the same eat any poisonous material.

I claim:

1. A solid product suitable for killing crawfish and similar borers, which comprises a small amount of a cyanid together with a bonded hard mass of material which is capable of disintegration by water, such mass of material being many times greater than the amount of cyanid, and such solid product being rounded so as to readily roll and of a size adapted to be introduced into and to roll downwardly in a hole of a crawfish.

2. A product suitable for killing crawfish and similar borers, which comprises a small amount of a cyanid together with a bonded hard mass of material which is capable of disintegration by water, such mass of material being many times greater than the amount of cyanid, and being rounded so as to readily roll, and being provided with a coating not readily permeable to gases, and of a size adapted to be introduced into and to roll downwardly in a hole of a crawfish.

3. A body of generally rounded shape, of a size adapted to be introduced into and to roll downwardly in a crawfish hole, comprising a cyanid and a major portion of a material of a nature which crawfish will not eat.

4. A body of generally rounded shape, of a size adapted to be introduced into and to roll downwardly in a crawfish hole, comprising a cyanid and a major portion of a material of a nature which crawfish will not eat, such body being provided with a protective coating.

5. A process of killing crawfish by causing a generation of hydrocyanic acid in the lower portions of the holes in which the crawfish live, by introducing thereinto a rounded mass of material containing a cyanid.

In testimony whereof I affix my signature.

BENJAMIN H. STRONG.